(12) United States Patent
Stekelenburg et al.

(10) Patent No.: US 11,413,918 B2
(45) Date of Patent: Aug. 16, 2022

(54) FLY/DRIVE VEHICLE THAT IS CONVERTIBLE BETWEEN A ROAD RIDING CONDITION AND A FLYING CONDITION

(71) Applicant: PAL-V IP B.V., Raamsdonksveer (NL)

(72) Inventors: Michael Alwin William Stekelenburg, Vught (NL); Hans Joore, Oosterhout (NL); Christiaan Cornelius Klok, Breda (NL); Louis Petrus Valentijn Marie Van Rijn, Berkel en Rodenrijs (NL); Kevin Ricardo Van Der Beek, Puttershoek (NL); Erik Van De Ruit, Lekkerkerk (NL)

(73) Assignee: PAL-V IP B.V., Raamsdonksveer (NL)

( * ) Notice: Subject to any disclaimer, the term of this patent is extended or adjusted under 35 U.S.C. 154(b) by 423 days.

(21) Appl. No.: 16/485,740

(22) PCT Filed: Feb. 12, 2018

(86) PCT No.: PCT/NL2018/000006
§ 371 (c)(1),
(2) Date: Aug. 13, 2019

(87) PCT Pub. No.: WO2018/147727
PCT Pub. Date: Aug. 16, 2018

(65) Prior Publication Data
US 2020/0055358 A1      Feb. 20, 2020

(30) Foreign Application Priority Data

Feb. 13, 2017   (NL) ..................................... 1042265

(51) Int. Cl.
*B60F 5/02* (2006.01)
*B64C 11/28* (2006.01)
*B64C 37/00* (2006.01)
*B64D 35/08* (2006.01)
(Continued)

(52) U.S. Cl.
CPC ................ *B60F 5/02* (2013.01); *B64C 11/28* (2013.01); *B63H 5/07* (2013.01); *B64C 29/0025* (2013.01); *B64C 37/00* (2013.01); *B64D 35/08* (2013.01)

(58) Field of Classification Search
CPC ......... B64C 11/28; B64C 37/00; B64D 35/08; B60F 5/02
(Continued)

(56) References Cited

U.S. PATENT DOCUMENTS 3,134,560 A * 5/1964 Halsmer ................. B64C 37/00
244/49
4,899,954 A * 2/1990 Pruszenski, Jr. .......... B60F 5/00
244/50
(Continued)

FOREIGN PATENT DOCUMENTS

CA          2374576 A1 *   3/1995   ............... B64C 1/00
CN       105539039 A  *   5/2016   ............... B60F 5/02
(Continued)

OTHER PUBLICATIONS

The Search Report and Written Opinion in NL Application No. 1042265, dated Oct. 2, 2017.

*Primary Examiner* — Christopher P Ellis
(74) *Attorney, Agent, or Firm* — Troutman Pepper Hamilton Sanders LLP; Ryan A. Schneider

(57) ABSTRACT

A fly/drive vehicle has a road riding condition and a flying condition, and is easily convertible between the road riding condition and the flying condition. The vehicle includes a body with a passenger compartment and a drive compartment, at least one steered wheel and at least one driven wheel, and a propulsion propeller. The propulsion propeller has a central propeller base projecting outside a longitudinal end of the vehicle, and two propeller blades hinged to the central base. In the flying condition, the propeller blades are (Continued)

in an operative spread-out position, in which they extend substantially in line with each other substantially perpendicular to the propeller's rotation axis. In the road riding condition, the propeller blades are hinged about substantially vertical hinge axes to be directed more parallel to the longitudinal direction.

13 Claims, 6 Drawing Sheets

(51) Int. Cl.
  *B63H 5/07* (2006.01)
  *B64C 29/00* (2006.01)
(58) Field of Classification Search
  USPC .......................................................... 244/7 R
  See application file for complete search history.

(56) References Cited

U.S. PATENT DOCUMENTS

| | | | | |
|---|---|---|---|---|
| 5,435,502 | A * | 7/1995 | Wernicke | B64C 39/10 244/45 R |
| 6,082,665 | A * | 7/2000 | Spitzer | B64C 37/00 246/221 |
| 2018/0065435 | A1 * | 3/2018 | Barot | B60F 5/02 |

FOREIGN PATENT DOCUMENTS

| | | | | |
|---|---|---|---|---|
| CN | 106166928 | A * | 11/2016 | |
| CN | 106564349 | A * | 4/2017 | |
| CN | 109017182 | A * | 12/2018 | |
| CN | 109263417 | A * | 1/2019 | ............... B60F 5/02 |
| CN | 109455051 | A * | 3/2019 | ............... B60F 5/02 |
| CN | 110254710 | A * | 9/2019 | ............... B60F 5/02 |
| CN | 111619798 | A * | 9/2020 | |
| CN | 111823797 | A * | 10/2020 | |
| CN | 112060847 | A * | 12/2020 | |
| CN | 111532430 | B * | 3/2021 | |
| CN | 113135078 | A * | 7/2021 | |
| CN | 113348098 | A * | 9/2021 | ............... B60F 5/02 |
| CN | 113427954 | A * | 9/2021 | |
| DE | 2421627 | A | 11/1975 | |
| DE | 202015005887 | U | 10/2015 | |
| DE | 102019001130 | B3 * | 2/2020 | |
| ES | 2706658 | A1 * | 3/2019 | ............... B60F 5/02 |
| ES | 2842327 | T3 * | 7/2021 | ........... B64C 25/405 |
| FR | 3111326 | A1 * | 12/2021 | |
| JP | 2004082992 | A | 3/2004 | |
| RU | 2725866 | C1 * | 7/2020 | ............... B60F 5/02 |
| WO | 2013070061 | A | 5/2013 | |

* cited by examiner

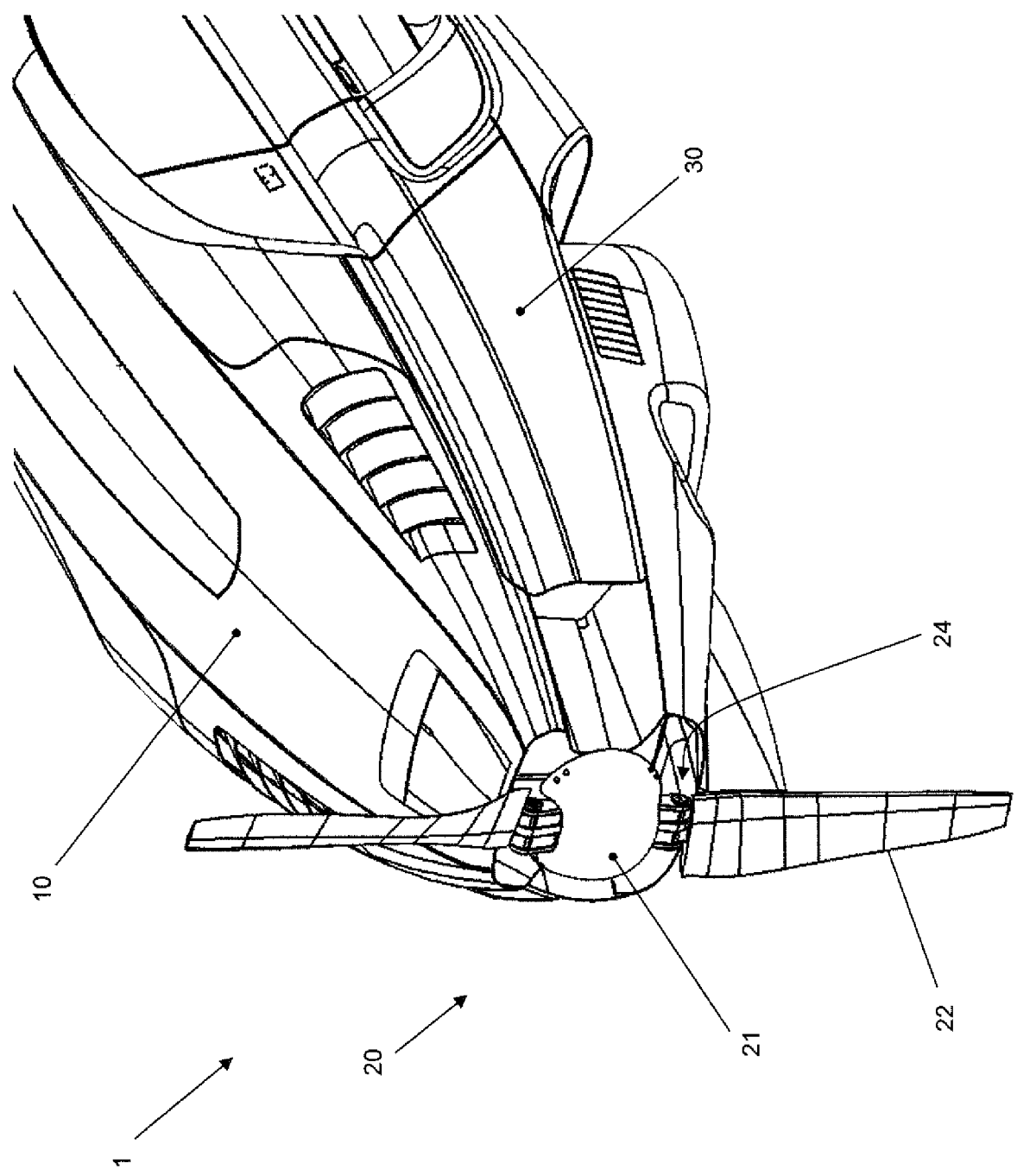

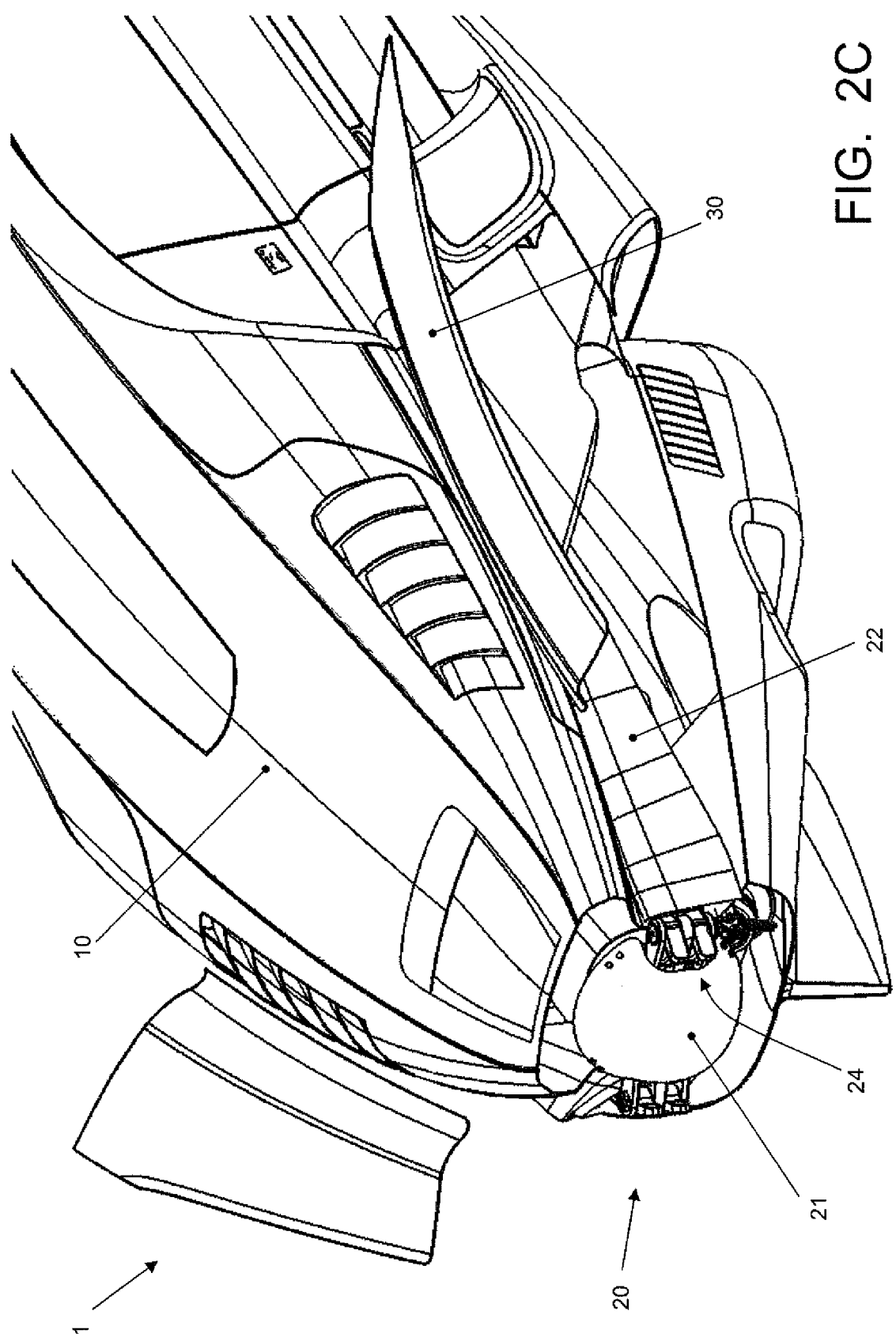

FLY/DRIVE VEHICLE THAT IS CONVERTIBLE BETWEEN A ROAD RIDING CONDITION AND A FLYING CONDITION

FIELD OF THE INVENTION

The present invention relates in general to a vehicle capable of flying in air and for riding on a road. Typically, it is customary for airplanes and helicopters to be either flying or standing on the ground, in a parking condition. Nevertheless, it is not uncommon for airplanes and some helicopters to have wheels, so that they can be displaced over ground, for instance towards and from a parking location. Airplanes and helicopters may even ride over land, for instance during take-off or landing or during taxiing: except during landing when they already have airspeed, they use their air-propulsion for creating forward groundspeed. However, such ground travel is typically over a relatively short distance at a relatively low speed (except for take-off or landing), and such air-vehicles are not suitable for participating in road traffic.

On the other hand, for road traffic, cars have been developed, and they must meet requirements regarding size, maneuverability, safety, etc. These requirements are not met by flying vehicles, and airplanes and helicopters are not certified for use in traffic on public roads.

BACKGROUND OF THE INVENTION

While flying machines are not equipped for road traffic, cars are not equipped for flying. Nevertheless, it is desirable to have a vehicle that can be converted from a flying condition to an automotive riding condition, and vice versa. Specifically, the present invention relates in general to a hybrid fly/drive vehicle, i.e. a vehicle that has a flying condition in which it is capable of flying in air, and that has road riding condition in which it can drive on a road. In the road riding condition, it should handle and behave much like a normal passenger car. Further, in order to be certified as an air vehicle, it should meet all air safety requirements in its flying condition, and in order to be certified as a car, it should meet all road safety requirements in its road riding condition. The requirements to the configurations in both operating modes are quite different, and it is a challenge to make the vehicle in such a manner that all requirements will be met and that changing the configuration from one mode to the other or vice versa can be done in an easy, safe and reliable manner.

More particularly, the present invention relates to propulsion. The vehicle will have wheels. In the road riding condition, as in normal cars, at least part of the wheels will receive propulsion power from an engine for riding on the road. Further, the vehicle has flying propulsion means for providing propulsion in flying condition. The flying propulsion means comprise an engine-driven propeller, which may be located at the front or at the rear of the vehicle. In the flying condition, the propeller will receive propulsion power from an engine.

SUMMARY OF THE INVENTION

The present invention is particularly related to the design of the propeller and wheel drive means to make these components suitable in the flying condition as well as in the road riding condition, in a safe, efficient and economic manner.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which:

FIGS. 2A-2D are perspective views illustrating folding and storing of the propeller blades;

DETAILED DESCRIPTION OF THE INVENTION

Figure 1A:
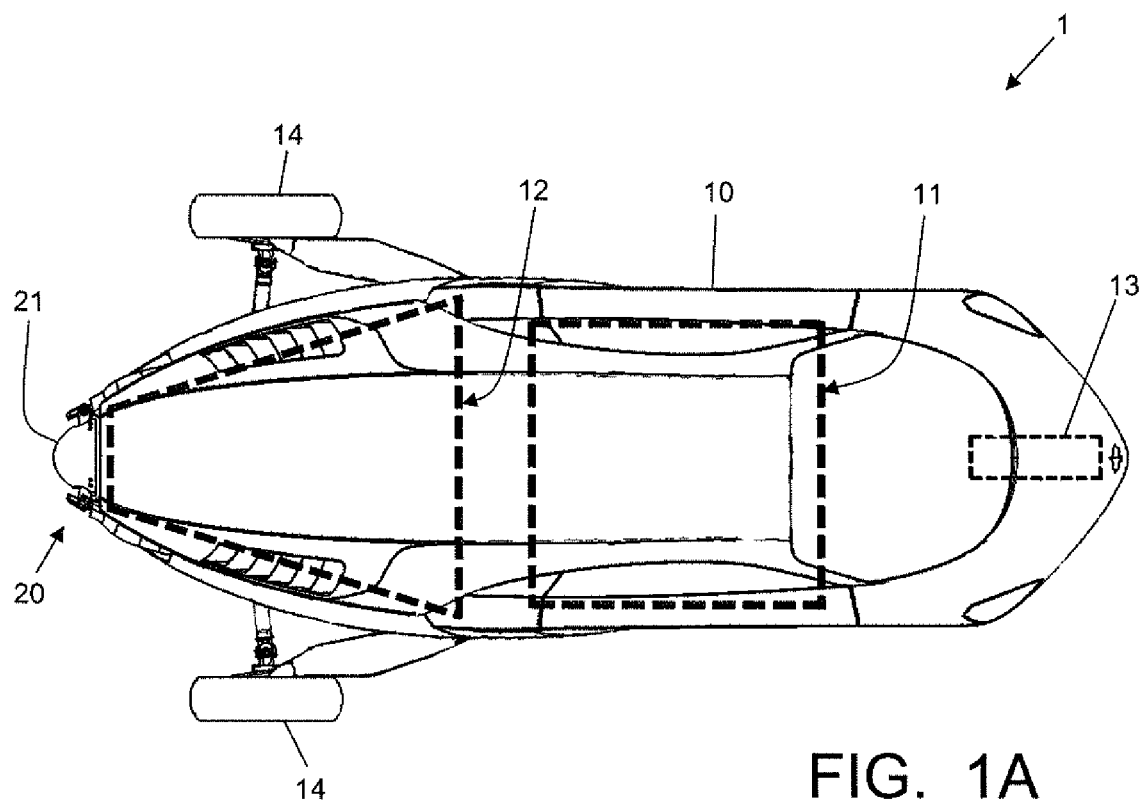
FIGS. 1A and 1B schematically show a top view of a fly/drive vehicle according to the present invention, in road riding condition and in flying condition, respectively.

FIG. 1A schematically shows a top view of a fly/drive vehicle 1 according to the present invention. The vehicle 1 has a body 10 with a generally aerodynamic drop shape. The front of the vehicle 10 is directed to the right in the figure. A longitudinal direction will be defined as front/rear direction, which is a left/right direction in the figure. Relative positions along this line will be indicated as front/rear, or before/behind.

A passenger compartment in the body 10 is generally indicated by a dotted line and reference numeral 11. Behind the passenger compartment 11, a drive compartment in the body 10 is generally indicated by a dotted line and reference numeral 12. The vehicle has at least one front wheel 13 and two rear wheels 14. At the position of the passenger compartment 11, the body 10 is relatively wide to accommodate two persons sitting next to each other. Going to the rear, the body 10 is narrowing with a view to the aerodynamic properties. At the rearmost position, a propulsion propeller 20 is rotatably mounted to a frame of the vehicle 1, which frame is not shown for sake of simplicity. The propeller 20 has its rotation axis directed substantially in longitudinal direction. A central base 21 of the propeller 20 projects out of the body 10.

For providing lift for the purpose of flying, the vehicle may be implemented as a gyrocopter and comprising a rotor. Since the rotor is no subject of the present invention, it is neither discussed nor shown. For sake of convenience, the propulsion propeller will hereinafter simply be indicated as propeller.

Figure 1B:
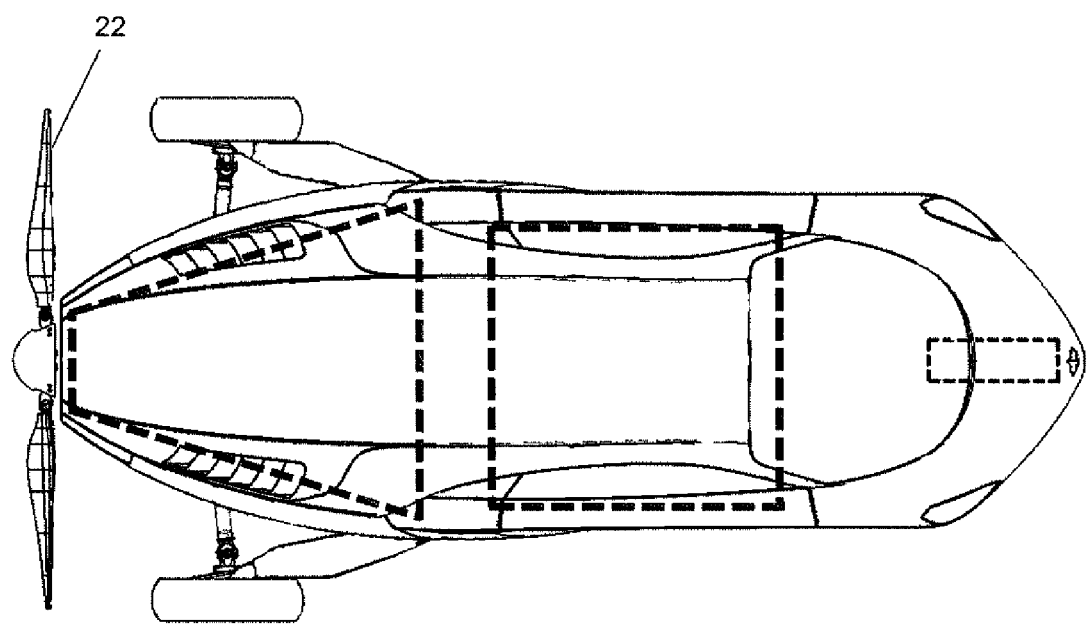

FIG. 1A shows the vehicle in road riding condition. FIG. 1B is a view comparable to FIG. 1A, showing the vehicle in flying condition. In the embodiment shown, the propeller 20 has two propeller blades 22 hinged to the central base 21. In the flying condition, the propeller blades 22 are in an operative spread-out position, in which they extend in line with each other substantially perpendicular to the propeller's rotation axis. Embodiments with three or more propeller blades are also possible.

While standing on the ground, the height above ground level of the central base 21 can be indicated as the propeller height Hp. Since the vehicle 10 should be able to behave as a normal car, the body 10 has a height comparable to normal cars. It further is desirable to have a relatively low centre of gravity. Taking all these considerations into account, the propeller height Hp can not be selected arbitrarily high. It should be clear that the propeller radius Lb can not be larger than Hp and should in fact be smaller with a safe margin. A practical value for Lb is about 95 cm in the flying condition.

With a view to allowing the propeller to be as efficient as possible and hence to take a "grip" on as much air as possible, it should be clear that the car body 10 should really be narrow at its rear end, only slightly larger than the central propeller base 21.

For reasons of aerodynamics and efficiency, it is further desirable to have the body 10 be as compact as possible. It should be clear that all these considerations lead to a design shape where the amount of space available in the drive compartment 12 is limited, and it is a challenge to find a combination of drive components and a topological solution for mounting them in that space.

When riding on the road, in normal traffic, the propeller blades 22 in their operative spread-out position could be considered a safety hazard, and in many countries road safety regulations will even forbid such sharp parts projecting from a car body. It is for this reason that the propeller blades 22 are foldable, i.e. they are hinged with respect to the central propeller base 21, about hinges 24 with tangential hinge axes, so that in the road riding condition the propeller blades 22 are directed more parallel to the longitudinal direction, i.e. the angle between the propeller blades and the propeller axis is substantially smaller than in the flying condition. In a possible embodiment, the propeller blades 22 in the road riding condition lie against the car body 10. In another possible embodiment, the car body 10 is provided with elongate blade accommodation recesses for receiving and accommodating the respective propeller blades 22 such that they do not project outside the car body 10.

In a more preferred embodiment, the propeller blades 22 are stored within the car body 10 while in road riding condition. This feature is illustrated in FIGS. 2A-2D.

FIG. 2A is a perspective view of the rear portion of the vehicle 1 in the flying condition. The car body 10 comprises two blade cover lids 30 arranged at the rear end of the right-hand side and left-hand side of the body, respectively, mounted at the propeller height Hp. Behind each lid 30, i.e. within the car body 10, the vehicle 1 has a blade accommodation space 31 for accommodating a respective propeller blade 22. These blade cover lids 30 may, as shown, have an elongate shape with a height smaller than the width, the width being in the longitudinal direction of the vehicle. It is noted that the figure shows a view from the right, and hence only shows the right-hand lid, while the left-hand lid at the opposite side of the body is not visible. The left-hand lid 30 may be mirror-symmetrical with the right-hand lid 30.

Figure 2B:
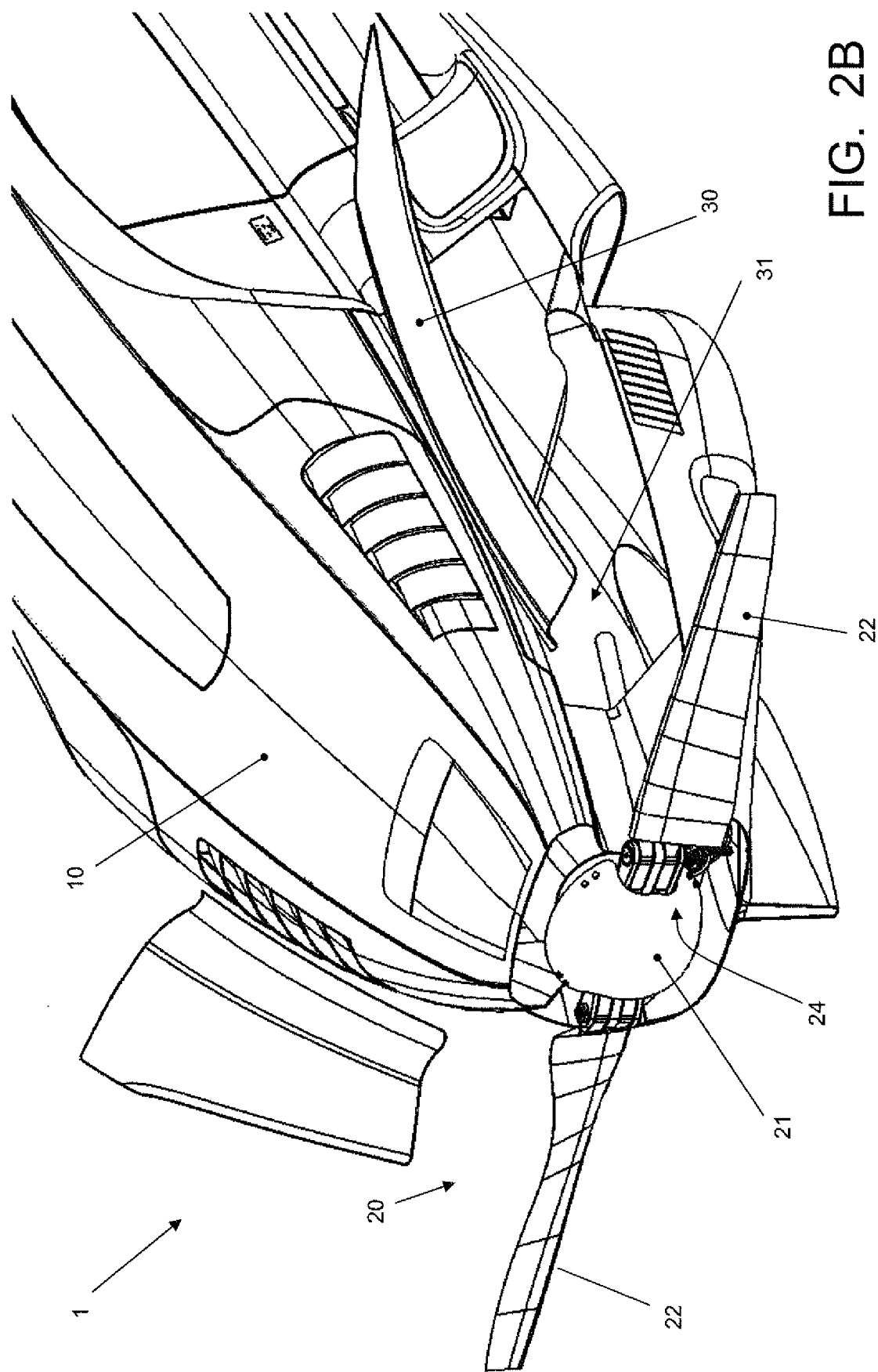
Figure 2D:
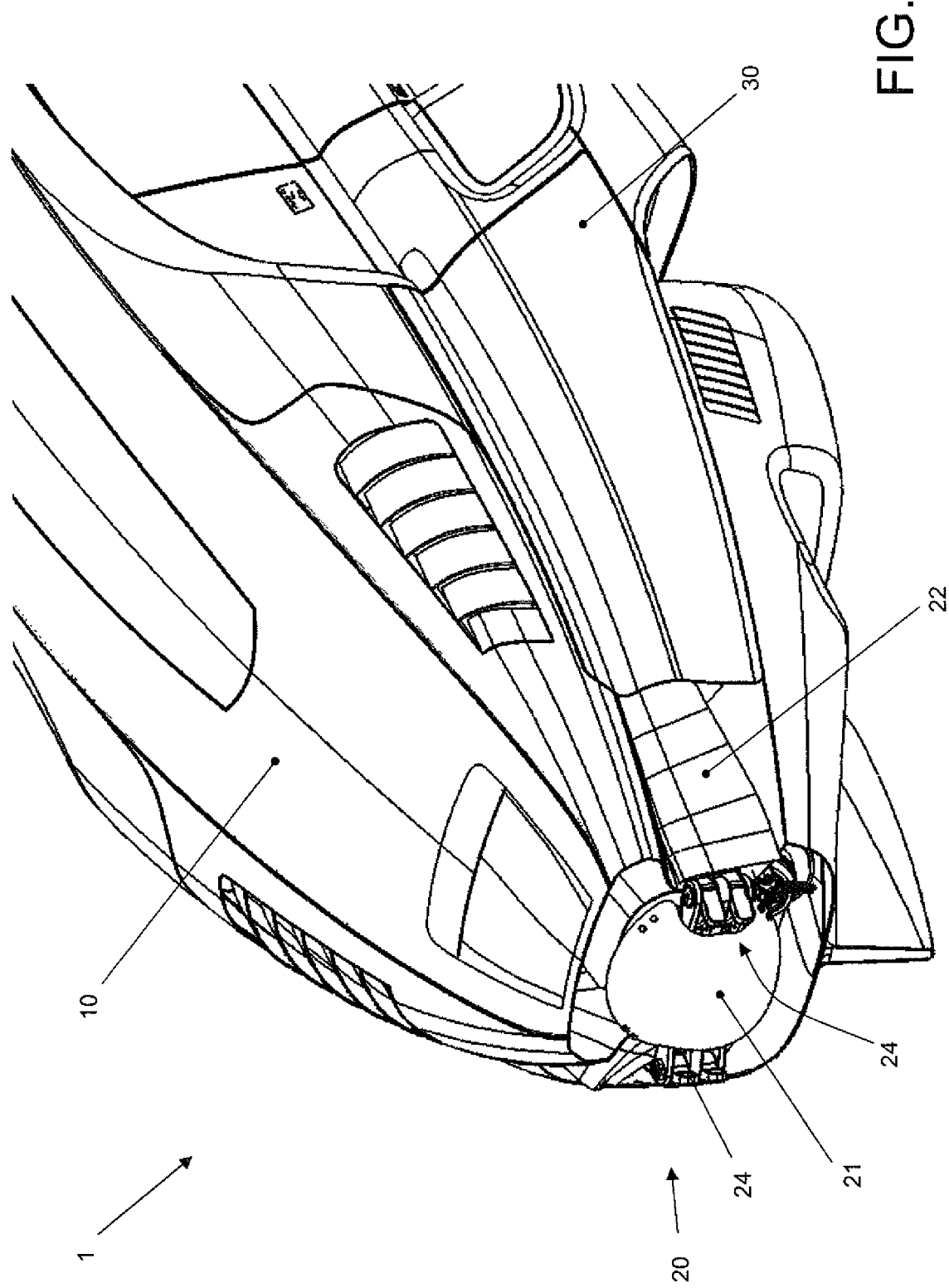

Each lid 30 has a closed condition, as shown in FIG. 2A, in which the lid lies flush with the surrounding body shape. Each lid 30 further has an open condition. In a convenient embodiment, the lid 30 is hinged at its upper side. FIG. 2B is a perspective view comparable to FIG. 2A, with the lids 30 in their open condition.

FIG. 2A shows the propeller blades 22 in the flying condition, in which they may have an arbitrary rotational position (vertical in this figure). As a step in converting the vehicle 1 from its flying condition to its road riding condition, the user manually rotates the propeller 20 such that the propeller blades 22 are directed horizontally and he opens the lids 30 (situation of FIG. 2B). The blade accommodation spaces 31 are now exposed. It is noted that in this situation the blade hinges 24, with which the propeller blades 22 are hinged to the propeller base 21, are directed substantially vertical.

As a next step, the user folds each propeller blade 22 (i.e. hinges each propeller blade 22 with respect to the central base 21) to make the propeller blade 22 enter the corresponding blade accommodation space 31; FIG. 2C is a perspective view comparable to FIG. 2B, with the propeller blades 22 positioned within the corresponding blade accommodation spaces 31. The user then closes the lids 30, which now lie over the propeller blades 22 (situation of FIG. 2D).

For holding the propeller blades 22 within the respective accommodation spaces 31, it is possible to provide the vehicle 1 with holding means. In a conveniently simple embodiment, such holding means may be implemented as foam clamping blocks mounted in the accommodation spaces 31 and at the inner side of the lids 30, such clamping blocks engaging a propeller blade 22 and clamping this propeller blade 22 between them when the corresponding lid 30 is closed.

It is noted that the propeller may have three (or more) blades. In such case, the number of blade accommodation spaces will be adapted, and the blades may have a "parking position" other than horizontal. On folding, the hinges 24 will then not necessarily be vertical, but in any case tangential.

Figure 3:
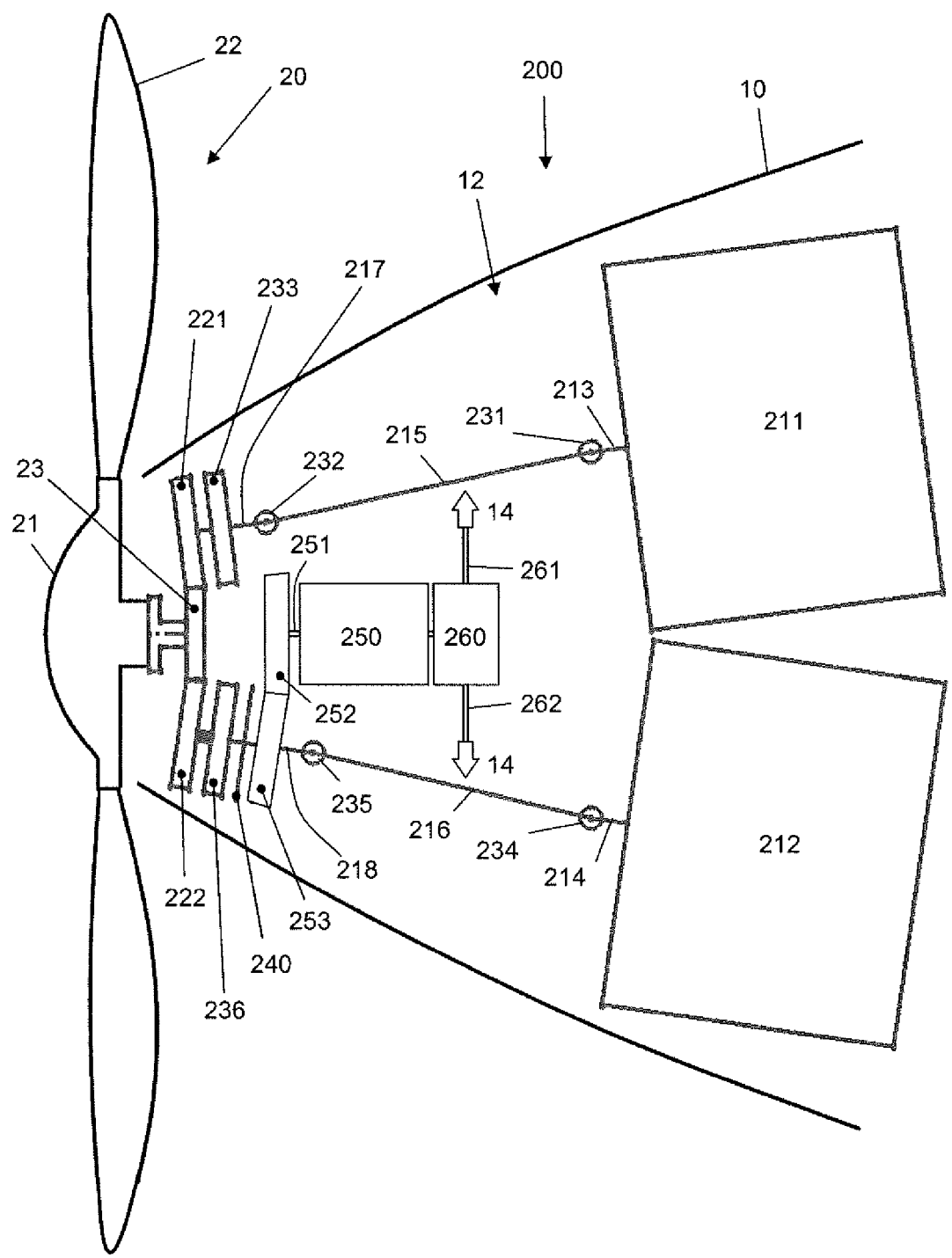
FIG. 3 is a view comparable to FIG. 1A illustrating on a larger scale the layout of the components of the driving means in the drive compartment.

FIG. 3 is a view comparable to FIG. 1A, on a larger scale, particularly showing the drive compartment 12, to illustrate the inventive layout of the drive components according to the present invention.

As mentioned earlier, the vehicle 1 has driving means 200 for driving the propeller 20 of the vehicle 1 in flying condition and for driving the driven wheels 14 of the vehicle 1 in road riding condition. These driving means 200 are arranged within the drive compartment 12 of the car body 10. It would theoretically be possible to have a separate drive means for the propeller and a separate drive means for the wheels, but this has drawbacks. According to an aspect of the invention, the drive means are, at least partly, common for the propeller 20 and for the driven wheels, which in the exemplary embodiment of FIG. 1A are the rear wheels 14. It is noted in this respect that an alternative embodiment is possible in which the propeller is mounted at the front end of the vehicle, in which case the vehicle will have two driven front wheels.

A further problem is that the required driving power in flying condition is relatively high. A single engine capable of providing that required driving power would be unnecessarily powerful for the road driving mode, making the wheel driving system relatively heavy and causing increased exhaust gas emissions.

A further problem is that the propeller is mounted to a propeller gear wheel that is located close to the propeller at the end of the vehicle. Driving power should be transferred to that propeller gear wheel via a drive gear wheel arranged adjacent the propeller gear wheel. In order to have these gear wheels fit in the limited amount of space available, and in order to reduce weight, these gear wheels should be small.

The above and other design problems are solved by the drive design according to the present invention.

According to an aspect of the present invention, the driving means 200 comprise two separate engines 211, 212 arranged next to each other at the forward end of the drive compartment 12, i.e. that portion of the drive compartment 12 which is remote from the propeller 20 and where the drive compartment 12 is widest. The propeller base 21 is attached to a propeller gear wheel 23 that is arranged at a relatively small axial distance from the propeller base 21, close to the propeller 20 and where the drive compartment 12 is less wide.

The propeller gear wheel 23 is in engagement with a first drive output gear wheel 221 that is driven by a first one 211 of said engines. An output axle of this first engine 211 is indicated by reference numeral 213. A first cardan axle 215 is coupled to the first output axle 213 via a first universal joint or cardan joint 231. A first drive axle 217 is coupled to the first cardan axle 215 via a second universal joint or cardan joint 232. The first drive output gear wheel 221 is mounted for free rotation with respect to the first drive axle 217. Mounted for rotation with the first drive axle 217 is an input end of a first one-way clutch or one-way coupling 233. The first drive axle 217 can drive the first drive output gear wheel 221 via the one-way coupling 233 but the first drive output gear wheel 221 can not drive the first drive axle 217 via the one-way coupling 233.

The propeller gear wheel 23 is further in engagement with a second drive output gear wheel 222 that is driven by a second one 212 of said engines. An output axle of this second engine 212 is indicated by reference numeral 214. A second cardan axle 216 is coupled to the second output axle 214 via a third universal joint or cardan joint 234. A second drive axle 218 is coupled to the second cardan axle 216 via a fourth universal joint or cardan joint 235. The second drive output gear wheel 222 is mounted for free rotation with respect to the second drive axle 218. A second one-way clutch or one-way coupling 236 is mounted for free rotation with respect to the second drive axle 218. Mounted for rotation with the second drive axle 218 is a selection coupling member 240. The selection coupling member 240 can be shifted axially with respect to the second drive axle 218 but is rotationally fixed with respect to the second drive axle 218, for instance via spline grooves, as known per se. The selection coupling member 240 can be selectively displaced towards the second one-way clutch or one-way coupling 236 to engage an input end of this second one-way clutch or one-way coupling 236. In this position of the selection coupling member 240, which will be indicated as the propeller drive position, the second drive axle 218 can drive the second drive output gear wheel 222 via the selection coupling member 240 and the second one-way coupling 236 but the second drive output gear wheel 222 can not drive the second drive axle 218 via the second one-way coupling 236.

It is noted that typically the diameter of the propeller gear wheel 23 is larger than the diameters of the first and second drive output gear wheels 221, 222.

For driving the driven wheels 14 of the vehicle 1 in road riding condition, the driving means 200 comprise a drive gear box 250 coupled to a differential assembly 260, having two output axles 261, 262 coupled to the respective driven wheels (not shown in FIG. 3 for sake of simplicity). In longitudinal direction, the drive gear box 250 and differential assembly 260 are located between the engines 211, 212 and the propeller gear wheel 23. In transverse direction, the drive gear box 250 and differential assembly 260 are located between the cardan axles 215, 216. At the side directed to the propeller 200, the drive gear box 250 has an input axle 251 on which an input gear wheel 252 is mounted. A third drive output gear wheel 253 is mounted for free rotation with respect to the second drive axle 218. The third drive output gear wheel 253 is mounted adjacent the selection coupling member 240 opposite the second one-way clutch or one-way coupling 236. In other words, going from second engine 212 towards propeller gear wheel 23, the second drive axle 218 carries the third drive output gear wheel 253, the selection coupling member 240, the second one-way clutch or one-way coupling 236, and the second drive output gear wheel 222, in this order. The selection coupling member 240 can be selectively displaced towards the third drive output gear wheel 253 to engage the third drive output gear wheel 253. In this position of the selection coupling member 240, which will be indicated as the wheel drive position, the second drive axle 218 can drive the third drive output gear wheel 253 via the selection coupling member 240, and hence drive the wheels 14.

In flying condition, with the selection coupling member 240 in its propeller drive position, the wheels 14 are not driven and the gear box 250 is in neutral. The third drive output gear wheel 253 is not coupled to the second drive axle 218, so the third drive output gear wheel 253 and the second drive axle 218 may freely rotate with respect to each other. It is noted that the propeller 20 is driven by both engines 211, 212. In road riding condition, with the selection coupling member 240 in its wheel drive position, only the second engine 212 is active; the first engine 211 is switched off. The propeller 20 remains stationary. The second drive output gear wheel 222 likewise remains stationary, with the second drive axle 218 rotating in the drive output gear wheel 222.

It is noted that, instead of toothed gear wheels 253, 252 for conveying power to the input axle 251 of the gear box 250, a chain or a toothed belt could be used, with the wheels 253, 252 suitably adapted.

It is noted that the engines can be of any type, for instance combustion and/or electric.

It is noted that the gear box can be of any type.

It is noted that the fact of having two engines operating simultaneously in flying condition contributes to safety: if one engine fails, the propeller 20 can still be driven by the other engine, while the one-way coupling prevents the failing engine to block the propeller.

As shown in the schematic drawing of FIG. 3, the cardan axles 215 and 216 are positioned oblique with respect to the longitudinal direction, i.e. their mutual distance at the side of the engines is larger than at the side of the propeller. With a view to realizing a low centre of gravity, the engines 211, 212 are placed as low as possible, while the propeller 20 is placed higher. Therefore, going from engines to propeller, the cardan axles 215 and 216 are also sloping upwards. Cardan joints have a maximum rating for the angle they can accommodate. To mitigate the requirements on the engine-sided cardan joints 231, 234, the engines 211, 212 are preferably arranged in an oblique manner, such that their output axles 213, 214 make a small angle larger than zero with the longitudinal direction, as illustrated.

In a possible embodiment, the first and second drive axles 217, 218 would be directed parallel to the longitudinal direction. In that case, the propeller-driving gear wheels 221, 222 could be straight-toothed gears. However, in order to mitigate the requirements on the propeller-sided cardan joints 232, 235, the first and second drive axles 217, 218 can be arranged lower than the propeller gear wheel 23 and can be arranged to make a small angle with the longitudinal direction, both in horizontal direction and in vertical direction, while the propeller gear wheel 23 and the propeller-driving gear wheels 221, 222 are conical wheels, as illustrated. The same applies to the third drive output gear wheel 253 and the input gear wheel 252 of the drive gear box 250.

It is noted that the positional layout of the drive train components, particularly the oblique cardan axles narrowing from engines to propeller, facilitate the folding of the propeller blades to a position within the car body.

It should be clear to a person skilled in the art that the present invention is not limited to the exemplary embodiments discussed above, but that several variations and modifications are possible within the protective scope of the invention as defined in the appending claims. Even if certain features are recited in different dependent claims, the present invention also relates to an embodiment comprising these features in common. Even if certain features have been described in combination with each other, the present invention also relates to an embodiment in which one or more of these features are omitted. Features which have not been explicitly described as being essential may also be omitted. Any reference signs in a claim should not be construed as limiting the scope of that claim.

The invention claimed is:

1. A fly/drive vehicle convertible between a road riding condition and a flying condition, the vehicle comprising:
   a body comprising:
      a passenger compartment;
      a propeller comprising:
         a propeller gear wheel in engagement with a first drive output gear wheel; and
         a propeller base attached to the propeller gear wheel;
      a drive compartment, wherein a portion of the drive compartment remote from the propeller is wider than a portion of the drive compartment close to the propeller;
      a steered wheel;
      a driven wheel; and
      driving means comprising a first engine and a second engine arranged next to each other in the remote portion of the drive compartment, the driving means configured to:
         drive the propeller in the flying condition; and
         drive the driven wheel in the road riding condition.

2. The vehicle according to claim 1, wherein the first drive output gear wheel is coupled to the first engine via a first cardan axle, and in engagement with a second drive output gear wheel that is coupled to the second engine via a second cardan axle; and
   wherein, the two cardan axles are oblique at least in the horizontal direction such that, in the direction from the engines to the propeller, their mutual distance reduces.

3. The vehicle according to claim 1, wherein the first drive output gear wheel is coupled to the first engine, and in engagement with a second drive output gear wheel that is coupled to the second engine; and
   wherein the propeller gear wheel, the first drive output gear wheel and the second drive output gear wheel are bevel wheels.

4. The vehicle according to claim 1, wherein the driving means further comprise a first drive axle that is coupled to the first engine, and a second drive axle that is coupled to the second engine;
   wherein the first drive output gear wheel is mounted for free rotation with respect to the first drive axle; and
   wherein the driving means further comprise a first one-way clutch or one-way coupling having an input end mounted for rotation with the first drive axle and having an output end coupled to the first drive output gear wheel, such that the first drive axle can drive the first drive output gear wheel but the first drive output gear wheel cannot drive the first drive axle.

5. The vehicle according to claim 4, wherein the propeller gear wheel is in additional engagement with a second drive output gear wheel that is mounted for free rotation with respect to the second drive axle;
   wherein the driving means further comprise a second one-way clutch or one-way coupling having an input end mounted for free rotation with respect to the second drive axle and having an output end coupled to the second drive output gear wheel;
   wherein the driving means further comprise a drive gear box having an output coupled to a differential assembly that has output axles coupled to the driven wheels;
   wherein the drive gear box has an input axle with an input wheel mounted thereon;
   wherein the driving means further comprise a third drive output wheel that is mounted for free rotation with respect to the second drive axle and that is coupled to the input wheel of the drive gear box;
   wherein the driving means further comprise a selection coupling member mounted for rotation with the second drive axle; and
   wherein the selection coupling member is arranged in between the second one-way clutch or one-way coupling and the third drive output wheel and is capable of being selectively shifted axially with respect to the second drive axle to selectively engage the input end of the second one-way clutch or one-way coupling in a propeller drive position or to selectively engage the third drive output wheel in a wheel drive position.

6. The vehicle according to claim 5, wherein, in longitudinal direction, the drive gear box and differential assembly are located between the first and second engines and the propeller gear wheel; and
   wherein, in transverse direction, the drive gear box and differential assembly are located between the cardan axles.

7. The vehicle according to claim 2, wherein the two cardan axles are oblique in the horizontal direction and the vertical direction such that, in the direction from the engines to the propeller, their mutual distance reduces and they rise.

8. The vehicle according to claim 4, wherein the propeller gear wheel is in additional engagement with a second drive output gear wheel that is mounted for free rotation with respect to the second drive axle;
   wherein the driving means further comprise a second one-way clutch or one-way coupling having an input end mounted for free rotation with respect to the second drive axle and having an output end coupled to the second drive output gear wheel;
   wherein the driving means further comprise a drive gear box having an output coupled to the driven wheel;
   wherein the drive gear box has an input axle with an input wheel mounted thereon;
   wherein the driving means further comprise a third drive output wheel that is mounted for free rotation with respect to the second drive axle and that is coupled to the input wheel of the drive gear box;
   wherein the driving means further comprise a selection coupling member mounted for rotation with the second drive axle; and
   wherein the selection coupling member is arranged in between the second one-way clutch or one-way coupling and the third drive output wheel and is capable of being selectively shifted axially with respect to the second drive axle to selectively engage the input end of the second one-way clutch or one-way coupling in a propeller drive position or to selectively engage the third drive output wheel in a wheel drive position.

9. The vehicle according to claim 1, wherein the propeller projects outside a longitudinal end of the vehicle, and two or more propeller blades are hinged to the propeller base with hinges having substantially tangential hinge axes;
   wherein, in the flying condition, the propeller blades are in an operative spread-out position, in which they extend substantially perpendicular to the propeller's rotation axis; and wherein, in the road riding condition, the propeller blades are hinged to be directed more parallel to the longitudinal direction.

10. The vehicle according to claim 9, wherein the body further comprises elongate blade accommodation spaces for receiving and accommodating the respective propeller blades within the body while in the road riding condition.

11. The vehicle according to claim 10, wherein the body further comprises blade cover lids covering the respective blade accommodation spaces.

12. The vehicle according to claim 10 further comprising holding means for holding each propeller blade within the respective accommodation space.

13. The vehicle according to claim 11 further comprising holding means for holding each propeller blade within the respective accommodation space;
wherein the holding means comprises a foam clamping block mounted in the accommodation space and at the inner side of the corresponding lid and engaging the propeller blade and clamping the propeller blade between them when the corresponding lid is closed.

\* \* \* \* \*